United States Patent [19]

Van Kirk et al.

[11] Patent Number: 4,752,097
[45] Date of Patent: Jun. 21, 1988

[54] SNAP-IN TRUCK BED LINER

[75] Inventors: LeRoy Van Kirk; Daniel Van Kirk, both of Elkhart, Ind.

[73] Assignee: LRV Corporation, Elkhart, Ind.

[21] Appl. No.: 738,427

[22] Filed: May 28, 1985

[51] Int. Cl.[4] .............................................. B62D 33/00
[52] U.S. Cl. .............................. 296/39 R; 224/42.42; 220/410
[58] Field of Search .................. 296/39 R; 224/42.42; 220/74, 410; 105/423

[56] References Cited

U.S. PATENT DOCUMENTS

| | | | |
|---|---|---|---|
| 3,558,002 | 1/1971 | Lindgren | 220/74 |
| 3,941,301 | 3/1976 | Jorgensen | 220/74 |
| 4,047,749 | 9/1977 | Lambitz et al. | 296/39 R |
| 4,162,098 | 7/1979 | Richardson III | 296/39 R |
| 4,181,349 | 1/1980 | Nix et al. | 296/39 R |
| 4,341,412 | 7/1982 | Wayne | 296/39 R |
| 4,368,841 | 1/1983 | Eddy | 220/74 |
| 4,396,219 | 8/1983 | Cline | 296/39 R |
| 4,460,214 | 7/1984 | Kuhns | 296/33 |
| 4,575,146 | 3/1986 | Markos | 296/39 R |
| 4,592,583 | 6/1986 | Dresen et al. | 224/42.42 |
| 4,610,351 | 9/1986 | Coles et al. | 220/74 |

Primary Examiner—Dennis H. Pedder
Attorney, Agent, or Firm—Thomas J. Dodd

[57] ABSTRACT

A liner in formed sheet construction which overlies a truck bed. The liner includes side walls with upper channel portions which fit restrictively between the truck bed side wall and a downturned flange of the bed rail. No exterior fasteners are necessary to secure the liner to the truck bed.

4 Claims, 5 Drawing Sheets

SNAP-IN TRUCK BED LINER

SUMMARY OF THE INVENTION

This invention relates to a protective liner for a pick up truck bed and will have application to a snap-in liner.

Previous truck bed liners required exterior fasteners to secure the liner to the interior of the bed. Such constructions made it difficult to install a truck cap upon the bed walls by conventional methods. They also promoted warping or bowing of the liner side walls and required drilling of the truck bed metal.

The liner of this invention includes integral upstanding walls which terminate in a down-turned channel portion. The liner channel portion is snapped into securement under the truck bed upper rail. This allows the liner to be secured against the bed side walls without the use of exterior fasteners and to resist bowing or warping of the liner side walls. A truck or camper cap may also be installed upon the truck bed by the use of C-clamps connected to the bed rail. The liner may also include a front overlay which overlies the front wall of the truck bed to allow rapid mounting of a cap to the truck bed rails.

Accordingly, it is an object of this invention to provide a novel protective liner which is for a pick up truck bed.

Another object of this invention is to provide for a truck bed liner which can be quickly and securely mounted to a truck bed.

Another object of this invention to provide a snap-in liner which is for a pick up truck bed.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
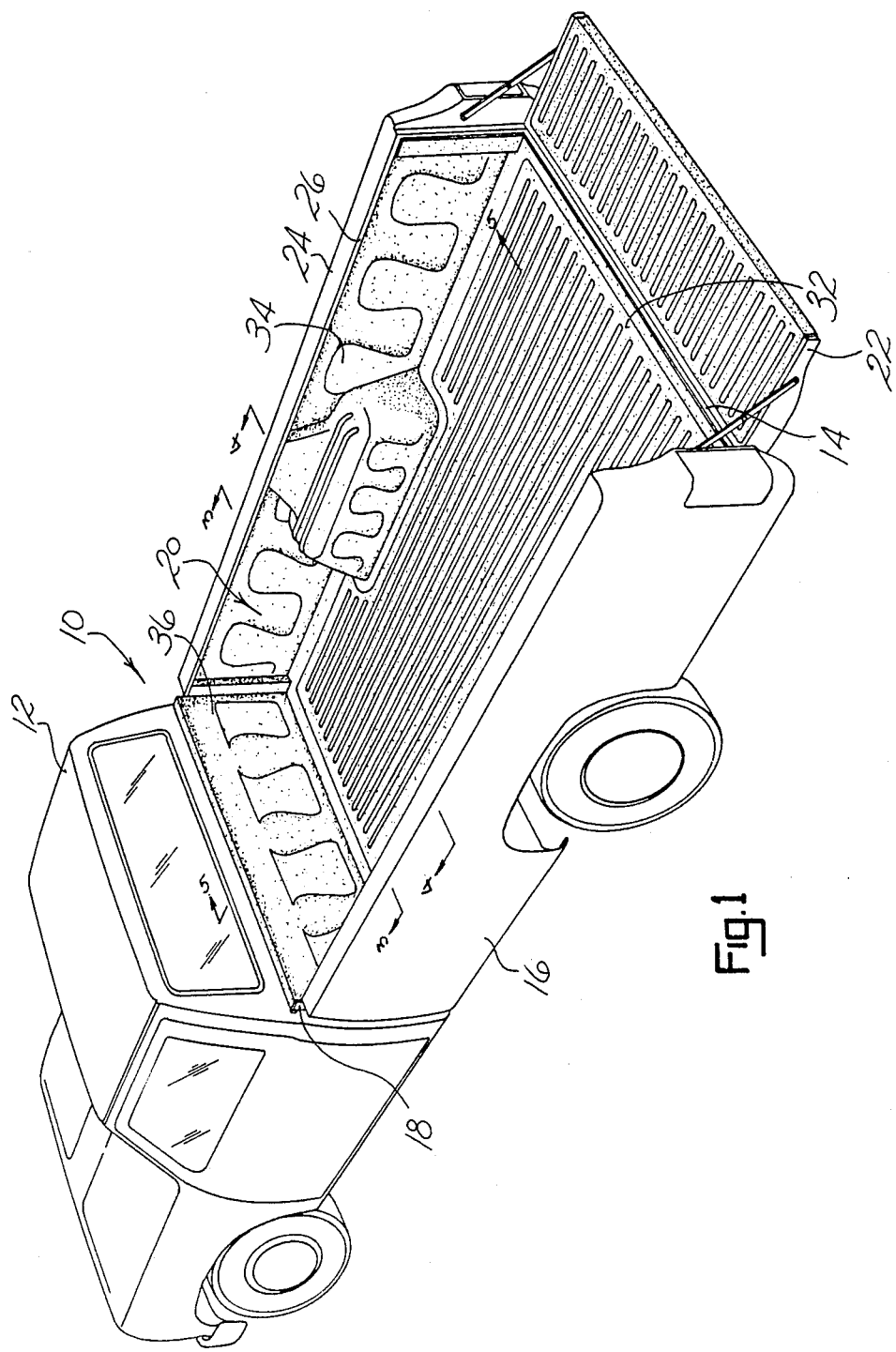
FIG. 1 is a perspective view of a pick up truck bed using the bed liner of this invention.
Figure 2:
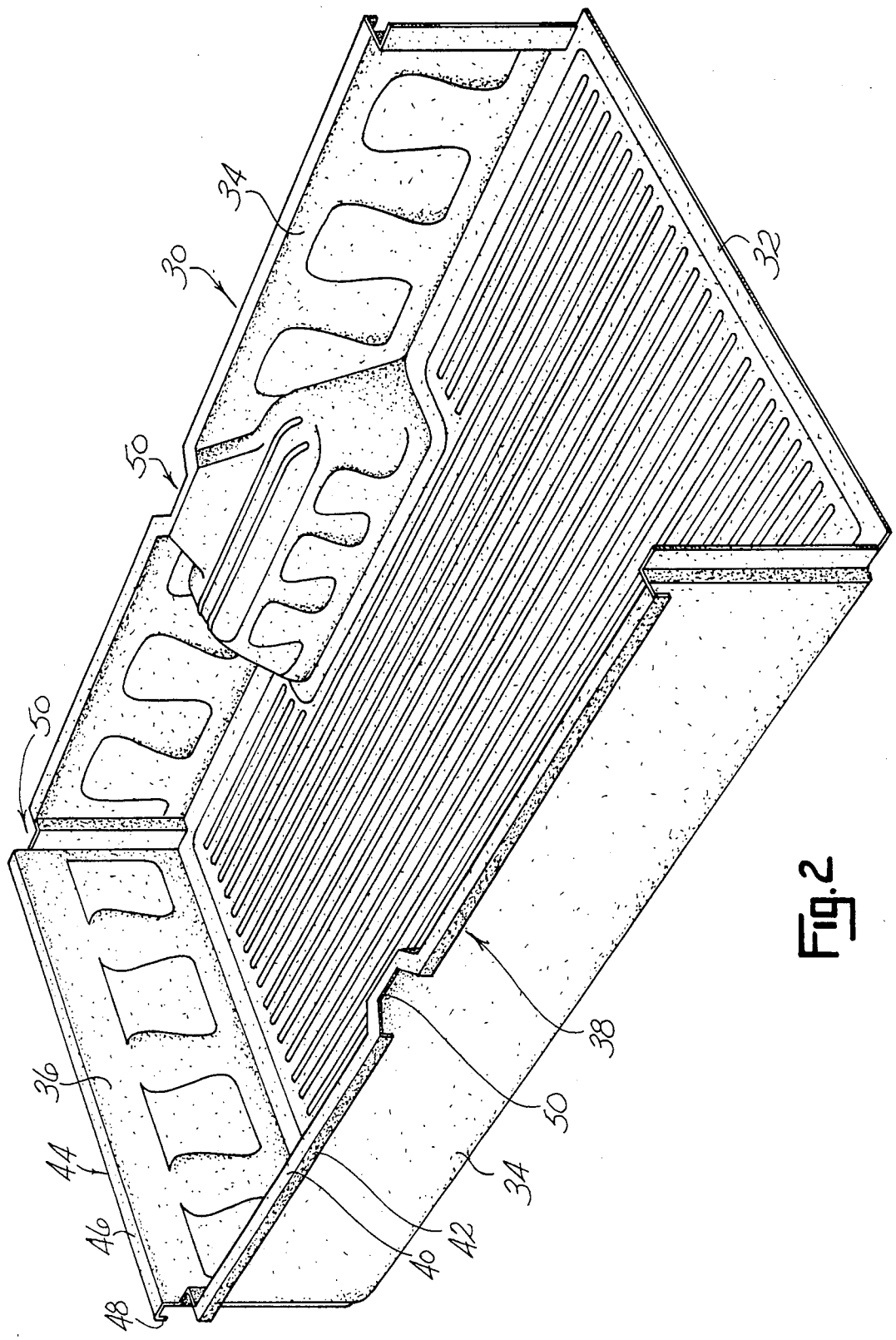
FIG. 2 is a perspective view of the liner.
Figure 3:
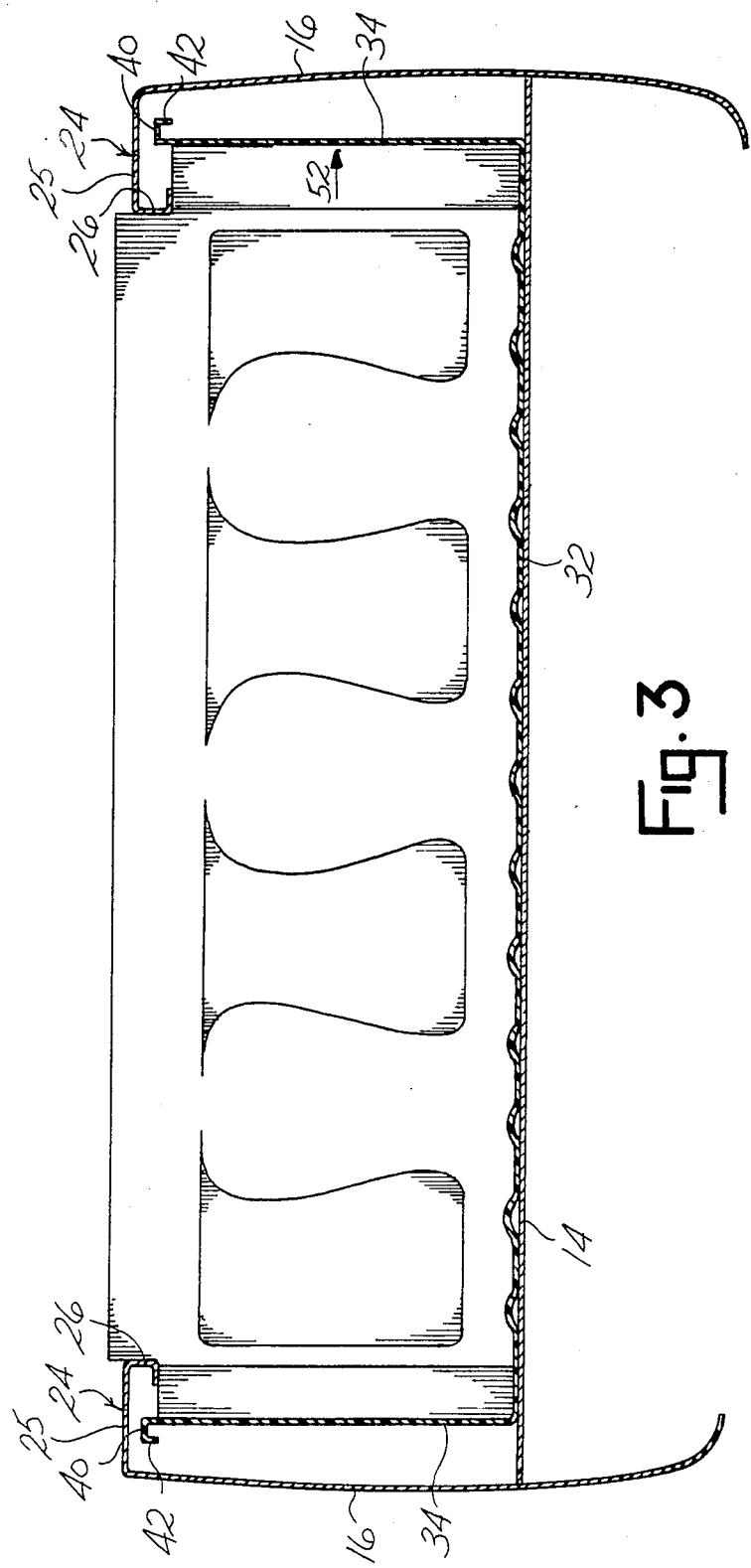
FIG. 3 is a fragmentary vertical sectional view taken along line 3—3 of FIG. 1.
Figure 4:
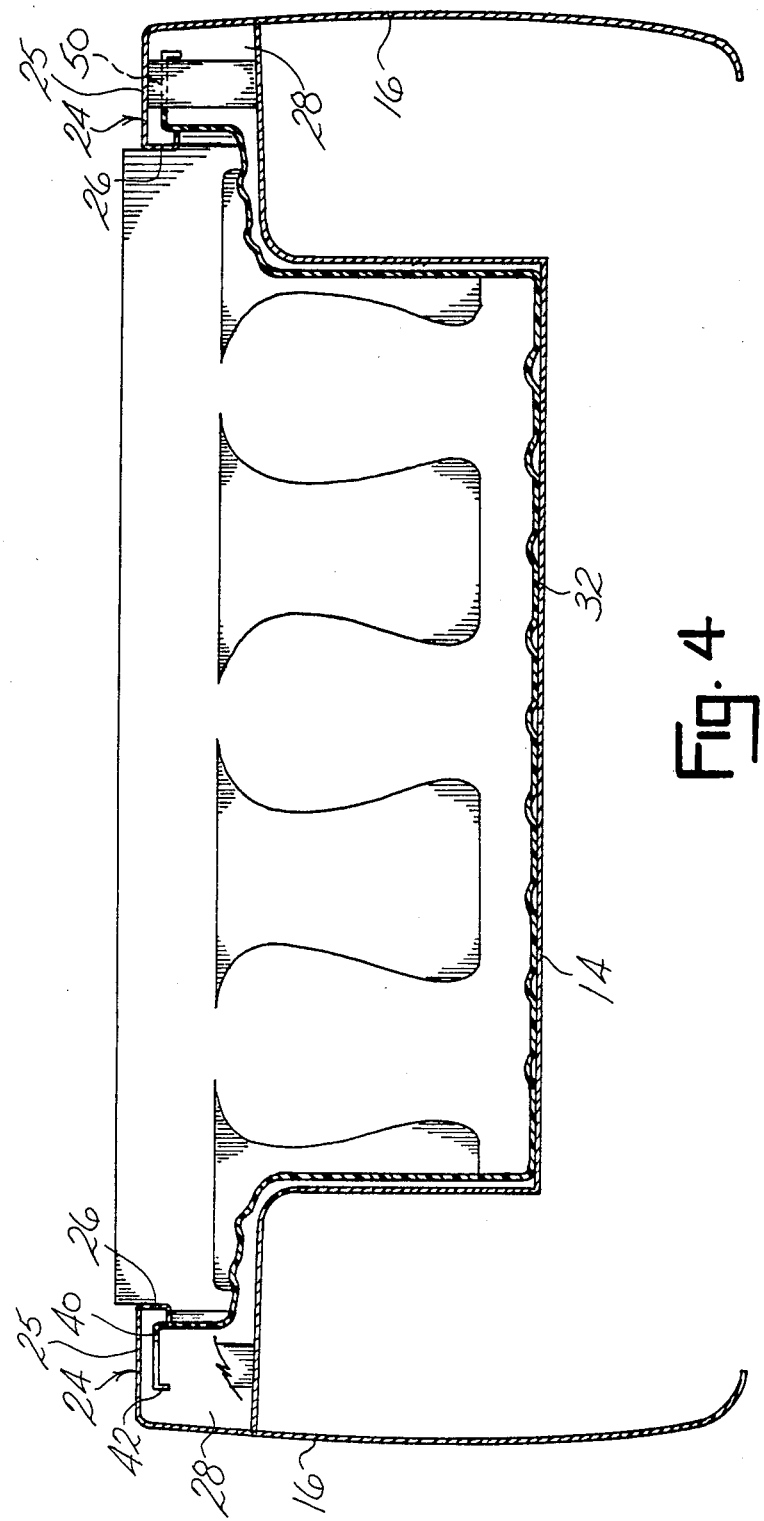
FIG. 4 is a fragmentary vertical sectional view taken along line 4—4 of FIG. 1.
Figure 5:
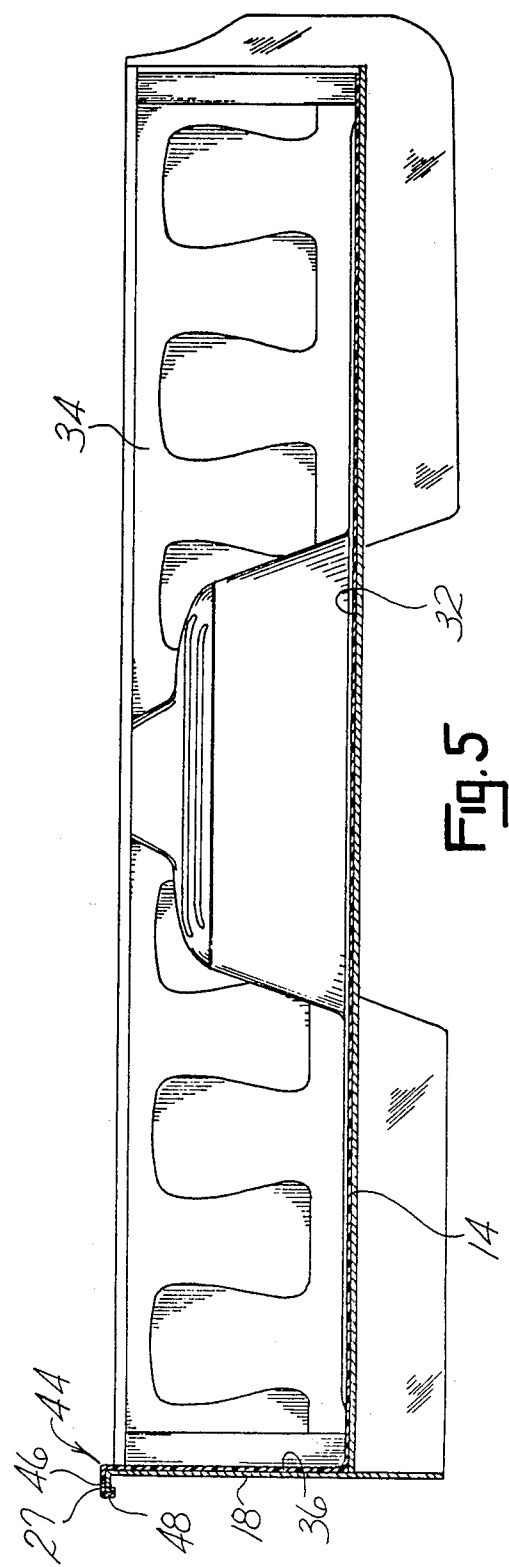
FIG. 5 is a fragmentary vertical sectional view taken along line 5—5 of FIG. 1.

FIG. 1 depicts a pick up truck 10 which has a front cab 12 and a rear bed 14. Bed 14 includes upstanding side walls 16 and front wall 18 which define a storage compartment 20. A tail gate 22 encloses the rear of compartment 20. Each bed side wall 16 includes an inwardly disposed top rail 24 which has a top 25 and a downwardly extending flange 26 as shown in FIGS. 2-4. A plurality of stake pockets 28 are positioned adjacent the corners and mid-length the side of the interior of each bed side wall 16.

A liner 30 is shown in FIGS. 1–5 and includes a floor portion 32 and integral side and front walls 34, 36. As shown in FIGS. 2 and 3, each liner side wall 34 terminates in a generally inverted U-shaped channel portion 38 formed by top flange 40 and a depending lip 42 extending from the top flange. Liner front wall 36 terminates in a generally inverted U-shaped channel 44 formed by top flange 46 and a depending lip 48. Front wall channel 44 is located at a greater height with respect to side wall channel portions 38. Liner 30 also includes slots 50 cut out of side wall top flanges 40 to accommodate stake pockets 28 of the truck bed. Liner 30 is formed of flexible but shape-retaining material.

Liner 30 is installed in truck bed 14 by positioning the liner in the truck bed with liner side walls 34 and front wall 36 positioned adjacent bed side walls 16 and front wall 18. Liner side walls 34 are then flexed downwardly and toward bed side walls 16 in the direction of arrow 52 with channel portions 38 fitting below bed wall top rail channels 24. The liner side walls are then released to snap-fit under rail channels 24 behind their flanges 26 as seen in FIG. 3. With liner side walls 34 so secured, front channel portion 44 overlies the top rail 27 of truck bed front wall 18. No exterior fasteners are required to further secure liner 30 to truck bed 14.

It is understood that the invention is not limited to the details above given but may be modified withing the scope of the appended claims.

We claim:

1. In combination, a vehicle having a bed with upstanding side walls, each side wall including an inwardly extending top and a downturned flange integral with said side wall top to form a rail, and a liner formed of a flexible shape-retaining material overlying said bed, said liner including integral upstanding side walls each terminating in a generally inverted outturned channel portion, each liner channel portion fitted between a said bed side wall and its said downturned flange and each liner side wall snapped into engagement with an underside of said rail to secure the liner to the bed.

2. The combination of claim 1 wherein said bed includes an upstanding front wall having a top rail, said liner including a front flange member overlying said bed front wall rail.

3. The combination of claim 1 wherein said bed side walls include stake pockets, said liner side wall channel portions including slots at said bed stake pockets to expose openings in said pockets with said liner contacting the stake pockets.

4. A method of installing a liner in a truck bed having upstanding side walls with side rails each defined by an inwardly extending top terminating in an integral downturned flange comprising the steps of:
   (a) providing said liner with upstanding walls terminating in an upper generally inverted outturned channel portion;
   (b) positioning said liner within said bed;
   (c) flexing said liner walls downwardly until each said liner side wall channel portion is positioned under one of said side wall rails, and
   (d) releasing said liner side walls to position said liner side wall channel portions between said bed side walls and the downturned flanges of said rails with each said liner wall snapped into engagement with an underside of said rail to secure the liner to said bed.

* * * * *